US012800127B2

(12) United States Patent
Wang

(10) Patent No.: US 12,800,127 B2
(45) Date of Patent: Nov. 17, 2026

(54) METHOD FOR MANUFACTURING A DECORATIVE LAMP

(71) Applicant: Xiangyong Wang, Bengbu (CN)

(72) Inventor: Xiangyong Wang, Bengbu (CN)

( * ) Notice: Subject to any disclaimer, the term of this patent is extended or adjusted under 35 U.S.C. 154(b) by 0 days.

(21) Appl. No.: 19/002,933

(22) Filed: Dec. 27, 2024

(65) Prior Publication Data

US 2026/0185678 A1 Jul. 2, 2026

(51) Int. Cl.
*F21V 3/06* (2018.01)
*F21S 4/10* (2016.01)

(52) U.S. Cl.
CPC ................ *F21V 3/063* (2018.01); *F21S 4/10* (2016.01)

(58) Field of Classification Search
CPC ............ F21V 3/063; F21V 31/04; F21S 4/10; F21S 4/15; F21K 9/235; F21K 9/232
See application file for complete search history.

(56) References Cited

U.S. PATENT DOCUMENTS 3,947,225 A * 3/1976 Audesse ................... F21K 5/02 431/362
4,271,458 A * 6/1981 George, Jr. ............... F21S 4/20 362/240
11,499,700 B1 * 11/2022 Tsai .......................... F21S 4/10
2003/0223238 A1 * 12/2003 Hsu .......................... F21S 4/10 362/255
2004/0007710 A1 * 1/2004 Roy ........................ B44C 5/005 257/88
2005/0052885 A1 * 3/2005 Wu .......................... F21V 3/04 362/565
2006/0228472 A1 * 10/2006 Van Dyn Hoven .......................... F21V 33/0028 427/209
2011/0050098 A1 * 3/2011 Lenk ....................... F21V 3/061 315/32
2012/0106146 A1 * 5/2012 Hao ........................ F21V 3/063 362/235
2022/0204898 A1 * 6/2022 Peschl ..................... F21K 9/235
2023/0020560 A1 * 1/2023 Bukkems .............. F21V 19/008

* cited by examiner

*Primary Examiner* — Jong-Suk (James) Lee
(74) *Attorney, Agent, or Firm* — RENNER, OTTO, BOISSELLE & SKLAR

(57) ABSTRACT

A method for manufacturing a decorative lamp is disclosed. The method comprises: providing an injection port on a lamp shell; placing a light emitting source inside the lamp shell; and injecting and filling a light-transmitting adhesive into the lamp shell from the injection port to form at least one bubble, where an inner cavity of the lamp shell is filled with the light-transmitting adhesive and the light emitting source is wrapped by the light-transmitting adhesive. After the light-transmitting adhesive is solidified by cooling, the injection port can be sealed. The light-transmitting adhesive wraps the light emitting source to conduct light of the light emitting source and drive the at least one bubble to form at least one light emitting spot.

6 Claims, 3 Drawing Sheets

METHOD FOR MANUFACTURING A DECORATIVE LAMP

TECHNICAL FIELD

The present disclosure relates to the technical field of lamp installation, and in particular, to a decorative lamp, a lamp assembly having the decorative lamp, and a Christmas lamp string having the decorative lamp.

BACKGROUND

Existing decorative lamp bulbs, such as LED decorative lamp bulbs, usually adopt a single-spot light emitting design, for example, an LED chip is mounted on a lamp holder, and light is concentrated or dispersed through a reflector or diffusion cover. However, this traditional structure leads to limitations in the light emitting effect, uneven light distribution, and poor overall visual effects. In addition, the packaging method of traditional decorative lamp bulbs often requires additional sealing processes, for example, a glass shell requires to be sealed by fusing, which increases manufacturing complexity and cost.

SUMMARY

The present disclosure aims to solve at least one of the technical problems in the existing technologies. To this end, the present disclosure provides a decorative lamp. By filling a light-transmitting adhesive into a lamp shell to form at least one bubble, light is scattered from the entire circumference of the bubble through refraction, achieving multi-spot light emission, and significantly improving the light emitting effect and aesthetics. In addition, this design also simplifies the packaging process, does not require additional sealing steps, and enhances the structural stability and waterproof performance of the lamp. Meanwhile, the use of high-quality PC resin or glass shells improves transmission of light and durability, prolongs the service life, and reduces production costs.

The present disclosure further provides a lamp assembly and a Christmas lamp string having the above decorative lamp.

The decorative lamp according to an embodiment of the present disclosure includes:

a lamp shell provided with an injection port;

a light emitting source disposed in the lamp shell; and a light-transmitting adhesive injected and filled into the lamp shell from the injection port to form at least one bubble, where the light-transmitting adhesive is capable of sealing the injection port after being solidified by cooling, and the light-transmitting adhesive wraps the light emitting source to conduct light from the light emitting source and drive the at least one bubble to form at least one light emitting spot.

The decorative lamp according to the present disclosure has at least the following beneficial effects. When the light-transmitting adhesive is injected into the lamp shell and solidified by cooling, it not only effectively wraps the light emitting source, but also naturally seals the injection port, thus avoiding the additional sealing process required by traditional LED decorative lamp bulbs. This seal-free design simplifies the production flow, reduces manufacturing complexity, and reduces potential leakage risks caused by poor sealing, greatly improving the waterproof performance and sealing reliability of the lamp. Meanwhile, the structure of the at least one bubble within the light-transmitting adhesive plays a key role, which serves as a secondary scattering medium for light, so that the light emitted from the light emitting source can be refracted in a colloid and uniformly scattered through 3600 entire circumference of the bubble. Furthermore, such a multi-spot light emitting effect greatly improves the overall visual effect of the decorative lamp, making the light distribution more uniform and softer, and enhancing the aesthetics and the decoration properties of the lamp. In addition, due to the existence of the bubble, the original single light emitting source seems to have become multiple dispersed small light emitting sources, which not only increases the layering of the light, but also enables the lamp to show good light emitting effects at different angles.

According to the decorative lamp according to some embodiments of the present disclosure, the light emitting source is connected to two conductive wires that are arranged at an interval, and the light-transmitting adhesive can fix the conductive wires after being solidified by cooling.

According to the decorative lamp according to some embodiments of the present disclosure, the injection port is positioned at one end of the lamp shell, and the conductive wires extend out of the lamp shell from the injection port.

According to the decorative lamp according to some embodiments of the present disclosure, an inner cavity of the lamp shell is filled with the light-transmitting adhesive.

The decorative lamp according to some embodiments of the present disclosure further includes a sealing plug, where the sealing plug seals the injection port after the light-transmitting adhesive is injected, and the sealing plug is adhered and fixed to an inner wall of the lamp shell after the light-transmitting adhesive is solidified by cooling.

According to the decorative lamp according to some embodiments of the present disclosure, the sealing plug is made of plastic or glass material.

According to the decorative lamp according to some embodiments of the present disclosure, the lamp shell is made of plastic or glass material.

According to the decorative lamp according to some embodiments of the present disclosure, the light emitting source is a light emitting diode.

The lamp assembly according to an embodiment of the present disclosure includes the decorative lamp according to the embodiment of the present disclosure; and a lamp holder sleeved over one end of a lamp shell where the injection port is located. After the light-transmitting adhesive is solidified by cooling, the lamp holder is adhered and fixed to the lamp shell.

The lamp assembly according to the present disclosure has at least the following beneficial effects. One end of the lamp shell where the injection port is located is sleeved by the lamp holder, after the light-transmitting adhesive is solidified by cooling, the lamp holder and the lamp shell are firmly adhered and fixed. This integrated structural design not only simplifies the assembly process and decreases the number of parts, but also improves the stability of the overall structure. Since additional mechanical connectors or complex sealing processes are no longer required, the manufacturing and assembly process of the lamp assembly becomes more concise and efficient, reducing production costs and reducing quality problems caused by poor assembly. Moreover, the adhesion and fixation of the lamp holder and the lamp shell ensures the further improvement of the sealing performance. The natural sealing effect of the light-transmitting adhesive after solidification by cooling, in combination with the tight fit with the lamp holder, forms a double sealing mechanism, making the lamp assembly have excellent waterproof and dustproof capabilities. This is particularly important for outdoor use scenarios, and can effectively resist the impact of harsh environments and prolong the service life of the lamp. In addition, this sealing method also helps prevent insects or other small organisms from entering the interior of the lamp, ensuring long-term stable operation of the lamp.

The Christmas lamp string according to an embodiment of the present disclosure includes a plurality of the decorative lamps according to the embodiment of the present disclosure.

The Christmas lamp string according to the embodiment of the present disclosure has at least the following beneficial effects. The lamp string connects the plurality of decorative lamps in series or in parallel, so that a complete lighting system solution is formed, which not only expands the application scope of a single decorative lamp, but also can create a coherent and unified visual effect, thereby greatly enriching the expression forms of decorative lighting. For various application scenarios such as indoor decoration, festival arrangement, and outdoor landscape lighting, the lamp strings can provide more diversified and personalized lighting solutions to meet the requirements of different occasions. Moreover, the light-transmitting adhesive fills each decorative lamp to form a plurality of bubbles, so that light is refracted in a colloid and scattered through the 360° entire circumference of the bubbles, realizing the transformation from a single light emitting source to multi-spot lighting. When a plurality of such decorative lamps are connected in series into a lamp string, the entire lamp string presents a uniform, soft and layered light emitting effect. This multi-spot light emitting design not only enhances the beauty of the light, but also shows good visual effects at different angles, providing users with a richer visual experience.

Additional aspects and advantages of the present disclosure will be set forth in part in the description which follows, and in part will be obvious from the description, or may be learned by practice of the present disclosure.

BRIEF DESCRIPTION OF DRAWINGS

The above and/or additional aspects and advantages of the present disclosure will become apparent and readily understood from the description of the embodiments in conjunction with the following accompanying drawings, in which.

Figure 1:
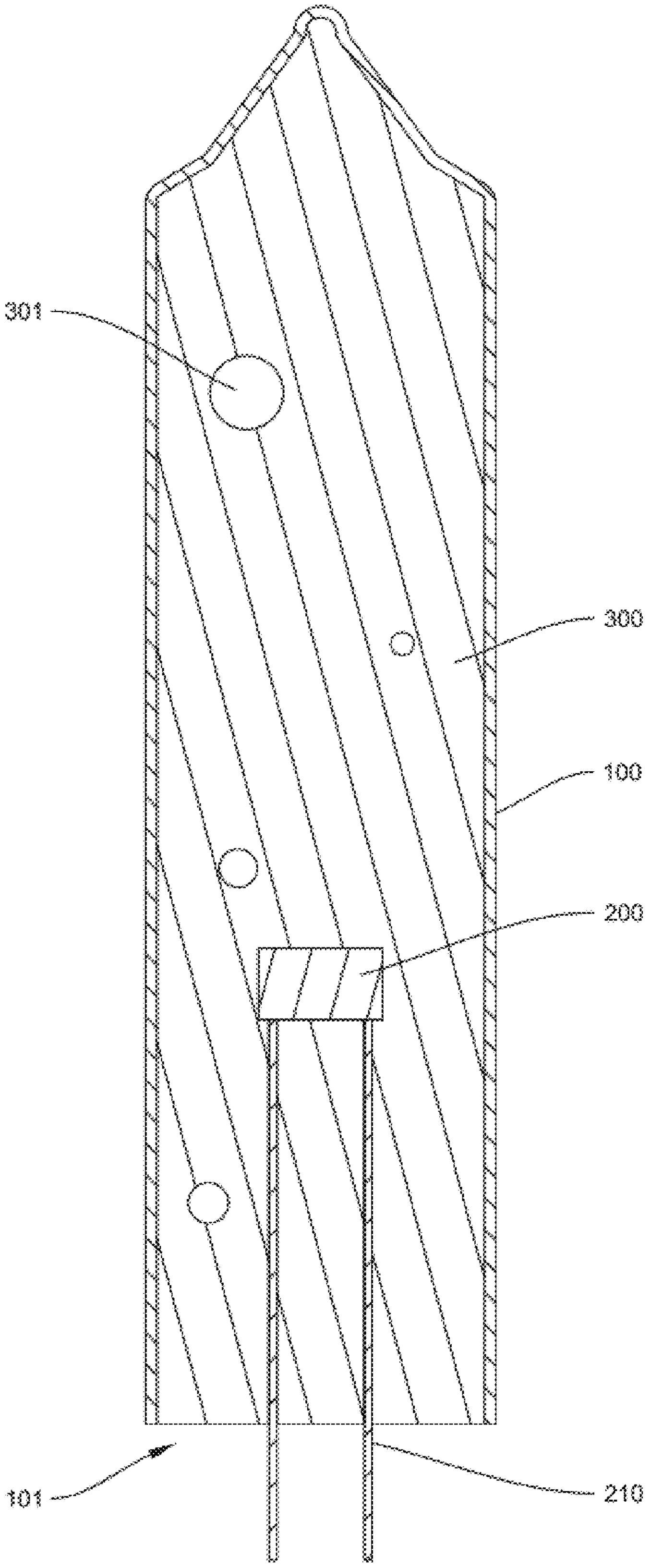
FIG. 1 is a schematic cross-sectional view of a decorative lamp according to an embodiment of the present disclosure.

EXPLANATION OF REFERENCE NUMERALS lamp shell 100; injection port 101;
light emitting source 200; conductive wire 210;
light-transmitting adhesive 300; bubble 301;
sealing plug 400.

DETAILED DESCRIPTION

The embodiments of the present disclosure are described in detail below. Examples of the embodiments are shown in the accompanying drawings, in which the same or similar reference numerals throughout represent the same or similar elements or elements with the same or similar functions. The embodiments described below with reference to the accompanying drawings are exemplary and are only used to explain the present disclosure and cannot be understood as limitations of the present disclosure.

In the description of the present disclosure, it should be understood that the orientation or position relationship related to the orientation description, such as upper, lower, front, back, left, right etc., is based on the orientation or position relationship shown in the accompanying drawings, which is only for the convenience of describing the present disclosure and simplifying the description, but does not indicate or imply that the device or element referred to must have a specific orientation, be constructed and operated in a specific orientation, and therefore cannot be understood as a limitation of the present disclosure.

In the description of the present disclosure, terms such as "several" means one or more, "a plurality of" means two or more, "greater than", "less than", "over", are understood as excluding the specified number, and "above", "below", "within" are understood as including the specified number. If there is a description of terms such as "first" and "second", it is only for the purpose of distinguishing technical features, and cannot be understood as indicating or implying the relative importance or implicitly indicating the number of indicated technical features or implicitly indicating the sequential relationship of indicated technical features.

In the description of the present disclosure, unless otherwise explicitly limited, words such as setting, installation, and connection should be understood in a broad sense. Those having ordinary skills in the art can reasonably determine the specific meaning of the above words in the present disclosure in combination with the specific content of the technical solution.

In the description of the present disclosure, the description referring to the terms "one embodiment", "an embodiment", "some embodiments", "exemplary embodiments", "examples", "specific examples" or "some examples" means that the specific features, structures, materials or characteristics described in connection with the embodiment or example are included in at least one embodiment or example of the present disclosure. In this specification, schematic representations of the above terms do not necessarily refer to the same embodiment or example. Furthermore, the specific features, structures, materials or characteristics described may be combined in any suitable manner in any one or more embodiments or examples.

Existing decorative lamp bulbs, such as LED decorative lamp bulbs, usually use a single-spot light emitting design, for example, an LED chip is mounted on a lamp holder, and light is concentrated or dispersed through a reflector or diffusion cover. However, this traditional structure leads to limitations in the light emitting effect, uneven light distribution, and poor overall visual effects. In addition, the packaging method of traditional decorative lamp bulbs often requires additional sealing processes, for example, a glass shell is required to be sealed by fusing, which increases manufacturing complexity and cost.

To this end, as shown in FIG. 1, the decorative lamp provided by the present disclosure includes a lamp shell 100, a light emitting source 200 and a light-transmitting adhesive 300. The lamp shell 100 is provided with an injection port 101, the light emitting source 200 is disposed in the lamp shell 100, and the light-transmitting adhesive 300 is injected and filled into the lamp shell 100 from the injection port 101 to form at least one bubble 301. After the light-transmitting adhesive 300 solidified by cooling, the injection port 101 can be sealed. The light-transmitting adhesive 300 wraps the light emitting source 200 to conduct light of the light emitting source 200 and drive the bubble 301 to form at least one light emitting spot. It could be easy to understand that after the light-transmitting adhesive 300 is injected into the lamp shell 100 and solidified by cooling, it not only effectively wraps the light emitting source 200, but also naturally seals the injection port 101, thus avoiding additional sealing process required for traditional LED decorative lamp bulbs. This seal-free design simplifies the production flow, reduces manufacturing complexity, and reduces potential leakage risks caused by poor sealing, greatly improving the waterproof performance and sealing reliability of the lamps. Meanwhile, the structure of the at least one bubble 301 in the light-transmitting adhesive 300 plays a key role, which serves as a secondary scattering medium for light, so that the light emitted from the light emitting source 200 can be refracted in a colloid and scattered through 3600 entire circumference of the bubble 301. Furthermore, such a multi-spot light emitting effect greatly improves the overall visual effect of the decorative lamp, making the light distribution more uniform and softer, and enhancing the aesthetics and the decoration properties of the lamp. In addition, due to the existence of the bubble 301, the original single light emitting source seems to have become multiple dispersed small light emitting sources, which not only increases the layering of the light, but also enables the lamp to show good light emitting effects at different angles.

In some embodiments of the present disclosure, as shown in FIG. 1, the light emitting source 200 is connected to two conductive wires 210, the two conductive wires 210 are arranged at an interval, the light-transmitting adhesive 300 can fix the conductive wires 210 after solidified by cooling, which ensures the stable position of the conductive wire 210 in the lamp shell 100, thereby greatly improving the reliability of the electrical connection. In contrast, in traditional LED decorative lamps, the conductive wires 210 usually rely on simple mechanical fixation. The two conductive wires 210 are fixed in advance by dispensing, and then the light emitting source 200 is placed into the lamp shell 100 as a whole, and then welded or packaged by hot melting, and thus the assembly process is more complex. Moreover, during the assembly, displacement or loosening may be easily caused due to vibration, temperature changes or external forces. In the present disclosure, since the conductive wires 210 do not require additional mechanical fixtures or complex welding processes, the entire assembly process is more concise and efficient. A manufacturer can complete the fixation of the conductive wires 210 while the light-transmitting adhesive 300 is filled, reducing the process steps, shortening the production cycle, and reducing the risk of errors caused by manual operations. Such production process optimization not only helps to improve production efficiency, but also effectively controls product quality and reduces the defective rate, thereby reducing the production cost. It should be noted that the conductive wires 210 are metal wires, such as copper wires, platinum wires, and dumet wires, and are used to power the light emitting source 200 for emitting light. Furthermore, the light-transmitting adhesive 300 firmly wraps the conductive wires 210 during solidification by cooling, reducing the process of fixing the conductive wires 210 by dispensing in advance, forming a robust, non-deformable structure after the light-transmitting adhesive 300 is solidified by cooling. The common light-transmitting adhesive 300 is glue. This fixing method not only enhances the connection strength between the conductive wires 210 and the light emitting source 200, but also avoids the problem of poor electrical contact caused by long-term use or external environmental factors, ensuring long-term stable operation of the lamp.

In some embodiments, the light-transmitting adhesive does not completely fill the inner cavity of the lamp shell, such as filling one-half or one-third and ensuring that the light emitting source is wrapped (not shown in the figure).

It should be noted that in the embodiment of the present disclosure, the light-transmitting adhesive 300 includes but is not limited to epoxy resin, acrylic glue, silicone sealant, UV curing glue, glass glue, transparent PVA glue, pressure-sensitive tape, etc.

In some embodiments of the present disclosure, referring again to FIG. 1, an inner cavity of the lamp shell 100 is filled with the light-transmitting adhesive 300. Since the light-transmitting adhesive 300 fills the inner cavity of the lamp shell 100, the integrity is stronger. Therefore, the lamp shell 100 is stronger and has better resistance to falling and breaking. When the light-transmitting adhesive 300 forms a plurality of bubbles 301 during injection, these bubbles 301 are randomly distributed throughout the lamp body, allowing the light emitted by the LED to be refracted multiple times in the colloid and scattered through the 360° entire circumference of each bubble 301. This multi-spot light emitting effect greatly improves the overall light emitting effect of decorative lamps, providing users with a more beautiful and comfortable visual experience. In addition, since the light is fully diffused in the colloid, the lamp can present a consistent and rich light emitting effect even when viewed from different angles, enhancing the decorative properties and the ornamental value. It should be noted that due to the characteristics of the glue itself, the bubbles 301 will naturally be generated during injection. Optionally, the quantity and quality of the bubbles 301 can be controlled by multiple segmented injections, or by adding air during injection. After the light-transmitting adhesive 300 is injected into the lamp shell 100, there can be one, two, or three bubbles 301, etc., the size of the bubbles 301 may be large or small, and the distance thereof from the light emitting source 200 may be short or long, which does not affect the effect of forming multi-spot light emitting with the light emitting source 200 as a whole.

Secondly, the completely filled design significantly improves the structural stability of the lamp. As an adhesive material, the light-transmitting adhesive 300 is tightly attached with the inner wall of the lamp shell 100 after solidification by cooling, forming a solid whole, which not only strengthens the connection strength between various components in the lamp body, such as the light emitting source 200 and the conductive wires 210, but also enhances the mechanical strength of the lamp shell 100 itself. In particular, for the lamp shell 100 made of glass, this enhancement is particularly obvious. Since the filled light-transmitting adhesive 300 can buffer the external impact force to a certain extent, the lamp shell 100 is prevented from being broken or damaged, thereby prolonging the service life of the lamp. Meanwhile, the stable internal structure also makes the lamp more durable during transportation and installation, reducing the potential risk of damage caused by vibration or collision.

Furthermore, completely filling the inner cavity of the lamp shell 100 with the light-transmitting adhesive 300 helps to improve the heat dissipation performance of the lamp. In some applications, the light emitting source 200 will generate heat when working. If the heat cannot be dissipated in time, the service life and the light emitting efficiency of the light emitting source 200 will be affected. In this regard, the completely filled design provides a continuous heat conduction path, so that the heat generated by the light emitting source 200 can be quickly transferred to the outer surface of the lamp shell 100 through the light-transmitting adhesive 300, and is finally dissipated to the surrounding environment. Such an efficient heat dissipation mechanism not only ensures that the LED lamp work stably for a long term, but also reduces the failure rate caused by overheating, further improving the safety and reliability of the lamp.

Furthermore, from the perspective of the production process, the completely filled design simplifies the production flow and reduces the difficulty of manufacturing. A manufacturer does not need to worry about the uneven distribution of internal voids or bubbles 301, and only needs to ensure that the light-transmitting adhesive 300 is fully injected into the lamp shell. Such process simplification not only improves production efficiency, but also effectively controls product quality and reduces the defective rate. Moreover, since the entire inner cavity of the lamp shell 100 is filled, the lamp shell 100 can be placed upside down to wait for the light-transmitting adhesive 300 to be solidified by cooling without causing the light-transmitting adhesive 300 to sink to affect the overall sealing effect, ensuring the packaging effect of the decorative lamp.

Furthermore, this design provides convenience for subsequent maintenance. For example, when the light emitting source 200 requires to be replaced or repaired, it only needs to reheat the light-transmitting adhesive 300, and the conductive wires 210 and the light emitting source 200 can be easily removed. There is no need to worry about damaging other components, which not only simplifies the maintenance process, but also prolongs the overall service life of the lamp and reduces the user's cost of use.

In some embodiments, the injection port is formed on the side wall of the lamp shell, such as opening a hole in the side wall of the lamp shell (not shown in the figure). In some embodiments of the present disclosure, referring again to FIG. 1, the injection port 101 is positioned at one end of the lamp shell 100. Optionally, the light emitting source 200 is mounted into the lamp shell 100 from the injection port 101, and the conductive wires for the light emitting source 200 extend out of the lamp shell 100 from the injection port 101, which ingeniously combines the layout of the injection port 101 and the leading position of the conductive wires 210, making the injection process of the light-transmitting adhesive 300 more straightforward and convenient. In some applications, the manufacturer can first arrange the light emitting source 200 and the conductive wires 210 in place during the assembly, and then fill the light-transmitting adhesive 300 through the injection port 101 positioned at one end of the lamp shell 100. This linear operation flow not only simplifies production steps, improves assembly efficiency, but also reduces operating errors caused by complex processes. Especially for automated production lines, this simple and intuitive design helps to achieve a higher degree of production automation, thereby further reducing production costs and improving product quality. In addition, such a design also helps to improve the waterproof performance of the lamp. Since the injection port 101 is also the outlet of the conductive wires 210, the light-transmitting adhesive 300 can naturally close the opening after being solidified by cooling, forming a seamless sealing surface. Compared with traditional sealing methods, this method not only is simpler and more effective, but also ensures long-term waterproofing effect. Especially in outdoor environments, such as gardens, courtyards or street lighting and other application scenarios, this good waterproof performance can effectively resist the influence of rain and other external factors, ensuring the stable operation of the lamp and prolonging the service life of the lamp. Meanwhile, the sealed design can also prevent insects or other small creatures from entering the interior of the lamp body, keeping the internal environment of the lamp clean, and reducing maintenance needs. In addition, the reasonable layout of the injection port 101 and the lead-out position of the conductive wires 210 also facilitates the installation and maintenance of the lamp. The user can easily adjust the position and length of the conductive wires 210 according to actual needs. For example, when the light emitting source 200 and the conductive wires 210 are placed into the lamp shell 100 as a whole, the adjustment of the position of the conductive wires 210 can drive the adjustment of the position of the light emitting source 200 in the lamp shell 100.

Figure 2:
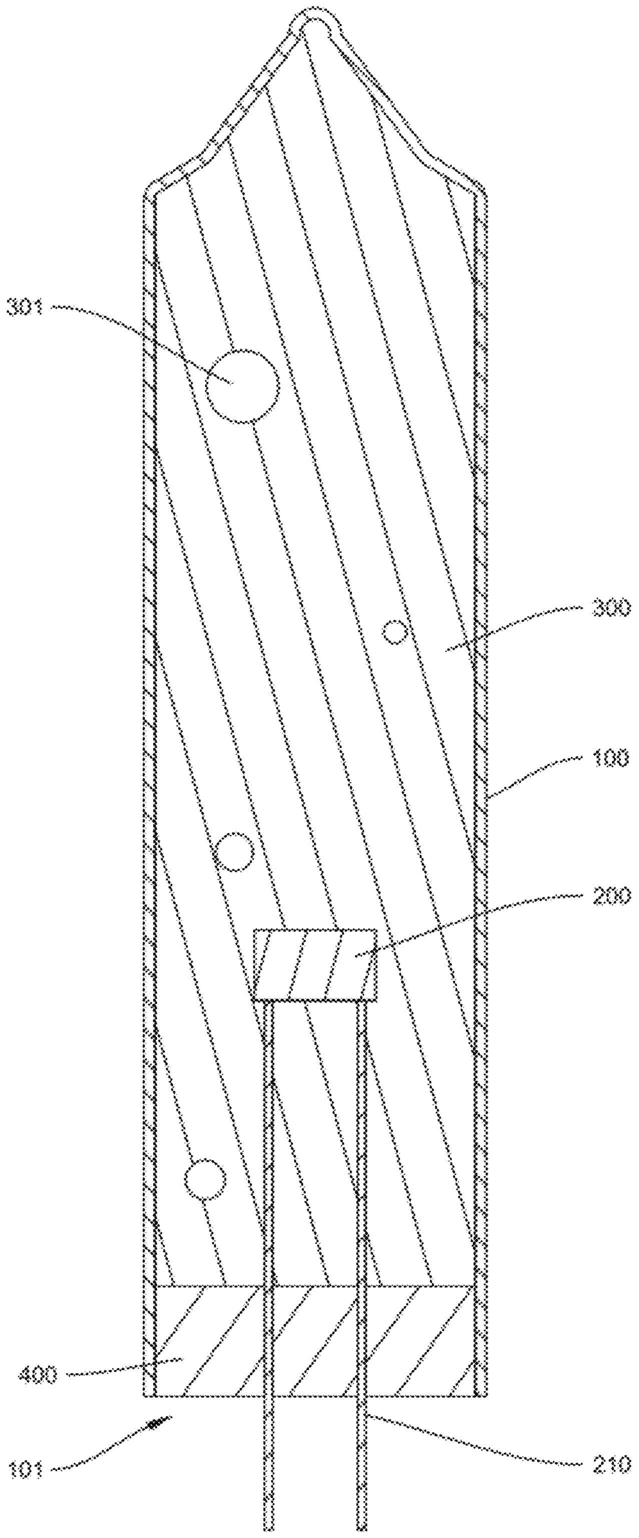
FIG. 2 is a schematic cross-sectional view of a decorative lamp according to another embodiment of the present disclosure.

Referring again to FIG. 2, in some embodiments of the present disclosure, the decorative lamp further includes a sealing plug 400. The sealing plug 400 blocks the injection port 101 after the light-transmitting adhesive 300 is injected, and is adhered and fixed to the inner wall of the lamp shell 100 after the light-transmitting adhesive 300 is solidified by cooling. In this regard, it not only optimizes the sealing performance of the decorative lamp, but also improves the stability of the overall structure and the simplicity of the production process, which provides users with a more reliable, efficient and beautiful lighting solution. First, the presence of the sealing plug 400 ensures that the injection port 101 is completely sealed after the light-transmitting adhesive 300 is solidified by cooling. Traditional LED decorative lamps usually require complex sealing processes, such as sealing by fusing or using additional sealing materials. These methods not only increase production difficulty and cost, but also affect the sealing effect of the lamps to a certain extent. In the present disclosure, the sealing plug 400 cooperates with the light-transmitting adhesive 300 to form a double sealing mechanism. The light-transmitting adhesive 300 naturally seals the injection port 101 during the cooling, and the sealing plug 400 further enhances this sealing effect. This double protection makes the lamp have excellent waterproof and dustproof capabilities, and especially in outdoor environments, it can effectively resist the influence of rain, moisture and other external factors, ensuring long-term stable operation of the lamp and prolonging the service life of the lamp. Secondly, the sealing plug 400 is mounted directly after the injection of the light-transmitting adhesive 300 is completed, without the need for additional sealing equipment or complex processes. This simplified operation not only improves production efficiency and reduces manufacturing costs, but also reduces the quality issues caused by poor sealing. For example, after the light-transmitting adhesive 300 is fully filled, the injection port 101 is plugged by the sealing plug 400. At this time, even if the injection port 101 faces slightly downward, the sealing plug 400 can block the light-transmitting adhesive 300 from flowing out, which greatly optimizes the process of waiting for the cooling solidification of the light-transmitting adhesive 300, and improves product consistency. In addition, since the sealing plug 400 can directly contact and be adhered and fixed to the light-transmitting adhesive 300, it can also play a role in assisting in fixing the internal components. It is easy to understand that the conductive wires 210 can directly pass through the sealing plug 400, thus the sealing plug 400 can assist in fixing and positioning the conductive wires 210 and the light emitting source 200, enhancing the structural stability of the entire lamp. In particular, for the lamp shell 100 made of glass, this enhancement is particularly important. Since the sealing plug 400 can buffer external impact force, the lamp shell 100 is prevented from being broken or damaged, thereby improving the safety and durability of the lamp.

Optionally, the sealing plug 400 is made of plastic or glass materials, such as resin or glass. After the sealing plug 400 and the light-transmitting adhesive 300 can be tightly adhered and fixed after the light-transmitting adhesive is solidified by cooling, so as to form a robust sealing effect and ensure the waterproof performance of the lamp. In some applications, the light emitting source 200 and the conductive wires 210 are used as a whole, such as constituting a light emitting diode. In this regard, the light emitting diode can be inserted into the sealing plug 400 through the conductive wires 210 for installation. Then, after glue injecting, the sealing plug 400 is integrally inserted into the lamp shell 100 to achieve integral fixed packaging. Corresponding to the material of the sealing plug 400, the lamp shell 100 is made of plastic or glass materials, for example, the lamp shell 100 is a common resin shell or PC shell, which has the advantages of being lightweight and easy to mold, is suitable for mass production, has good impact resistance and is suitable for outdoor environments or occasions that require frequent movement. Alternatively, the lamp shell 100 is a glass shell, which not only does not age, but also has excellent transmission of light and aesthetics, and can better meet the requirements of high-end decoration, such as commercial displays, high-end residences and other places. In addition, the glass shell not only provides clear and bright light output, but also exhibits exquisite and elegant appearance. More importantly, the glass shell combined with the filling design of the light-transmitting adhesive 300 enhances the anti-fragmentation performance to a certain extent and improves the safety and prolongs the service life of the lamp. This flexible material selection provides users with more diverse choices, meeting a wide range of needs from economy to high-end markets. Further, in some embodiments of the present disclosure, the light emitting source 200 is a light emitting diode. As one of the current lighting technologies which are most energy-saving, longest in service life and richest in color performance, light emitting diodes are an ideal choice for decorative lamps. It is easy to understand that choosing a light emitting diode as the light emitting source 200 not only conforms to the development trend of energy conservation and environmental protection, but also ensures high efficiency and low maintenance cost of the decorative lamp during long-term use. In particular, the light emitting diode can provide high brightness and multiple color choices at low power consumption, enriching the expression form of decorative lamps. In addition, the compact size of the light emitting diode allows it to be easily mounted inside the lamp shell 100 and perfectly cooperate with the light-transmitting adhesive 300 and the bubbles 301 to achieve a uniform and soft multi-spot light emitting effect.

Figure 3:
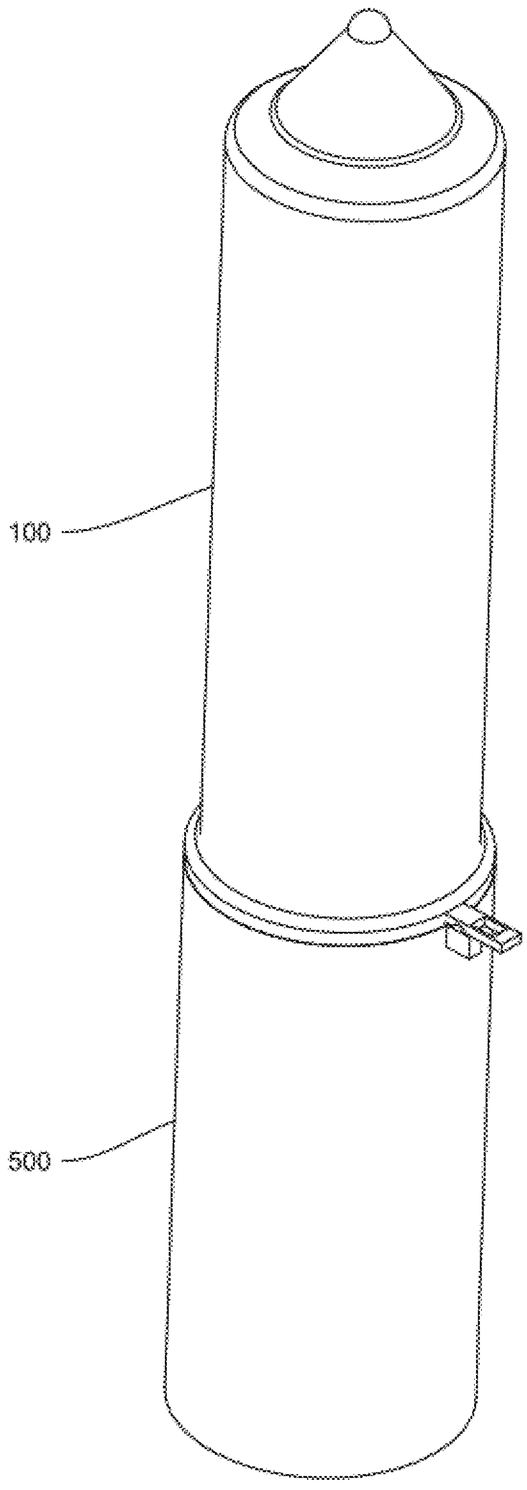
FIG. 3 is a schematic structural diagram of a lamp assembly according to an embodiment of the present disclosure.

Referring further to FIG. 3, a lamp assembly according to an embodiment of the present disclosure includes the decorative lamp according to an embodiment of the present disclosure and a lamp holder. The lamp holder is sleeved over one end of the lamp shell 100 where the injection port 101 is located. After the light-transmitting adhesive 300 is solidified by cooling, the lamp holder is adhered and fixed to the lamp shell 100. It is easy to understand that after the light-transmitting adhesive 300 is filled, the lamp holder is sleeved over one end of the lamp shell 100 where the injection port 101 is located, and the injection port 101 is placed slightly downward to allow a small amount of the light-transmitting adhesive 300 to flow out, so that after the light-transmitting adhesive 300 is solidified by cooling, the lamp holder can be firmly bonded to the lamp shell 100. This integrated structural design not only simplifies the assembly process and decreases the number of parts, but also improves the stability of the overall structure. Since additional mechanical connectors or complex sealing processes are no longer required, the manufacturing and assembly process of the lamp assembly becomes more concise and efficient, reducing production costs and reducing quality problems caused by poor assembly. Moreover, the adhesion and fixation of the lamp holder and the lamp shell 100 ensures the further improvement of the sealing performance. The natural sealing effect of the light-transmitting adhesive 300 after solidification by cooling, in combination with the tight fit with the lamp holder, forms a double sealing mechanism, making the lamp assembly have excellent waterproof and dustproof capabilities. This is particularly important for outdoor use scenarios, and can effectively resist the impact of harsh environments and prolong the service life of the lamp. In addition, this sealing method also helps to prevent insects or other small organisms from entering the interior of the lamp, ensuring long-term stable operation of the lamp.

Other configurations and operations of the lamp assembly according to the embodiment of the present disclosure are known to those of ordinary skill in the art and will not be described in detail here.

According to an embodiment of the present disclosure, a Christmas lamp string is provided, which includes a plurality of the decorative lamps according to the embodiment of the present disclosure connected in series or in parallel. This embodiment of the present disclosure forms a complete lighting system solution, which not only expands the application scope of a single decorative lamp, but also can create a coherent and unified visual effect, thereby greatly enriching the expression forms of decorative lighting. For various application scenarios such as indoor decoration, festival arrangement, and outdoor landscape lighting, the lamp string can provide more diversified and personalized lighting solutions to meet the requirements of different occasions. Moreover, the light-transmitting adhesive 300 fills each decorative lamp to form a plurality of bubbles 301, so that light is refracted in a colloid and scattered through the 360° entire circumference of the bubbles 301, realizing the transformation from a single light emitting source to multi-spot lighting. When a plurality of such decorative lamps are connected in series into a lamp string, the entire lamp string presents a uniform, soft and layered light emitting effect. This multi-spot light emitting design not only enhances the beauty of the light, but also shows good visual effects at different angles, providing users with a richer visual experience.

Other configurations and operations of the Christmas lamp string according to embodiments of the present disclosure are known to those of ordinary skill in the art and will not be described in detail here.

The embodiments of the present disclosure have been described in detail above with reference to the accompanying drawings. However, the present disclosure is not limited to the above embodiments. Within the scope of knowledge possessed by those of ordinary skill in the art, various modifications can be made without departing from the gist of the present disclosure.

What is claimed is:

1. A method for manufacturing decorative lamp, the method comprising:

providing an injection port positioned at one end of a lamp shell;

placing a light emitting diode (LED) inside the lamp shell;

connecting the LED with two conductive wires that are arranged at an interval, wherein the conductive wires extend out of the lamp shell from the injection port;

injecting and filling a light-transmitting adhesive into the lamp shell from the injection port to form at least one bubble, wherein an inner cavity of the lamp shell is filled with the light-transmitting adhesive and the LED is contacted directly with and wrapped by the light-transmitting adhesive;

cooling the light-transmitting adhesive, such that the light-transmitting adhesive is capable of fixing the conductive wires after being solidified by cooling, and the light-transmitting adhesive is capable of sealing the injection port after being solidified and conduct light from the LED and drive the at least one bubble to form at least one light emitting spot; and wherein the light-transmitting adhesive is injected by multiple segmented injections.

2. The method of claim 1, further comprising placing a sealing plug to seal the injection port after the light-transmitting adhesive is injected, such that the sealing plug is adhered and fixed to an inner wall of the lamp shell after the light-transmitting adhesive is solidified by cooling.

3. The method of claim 2, wherein the sealing plug is made of plastic or glass material.

4. The method of claim 1, wherein the lamp shell is made of plastic or glass material.

5. The method of claim 1, further comprising:

sleeving a lamp holder over one end of the lamp shell where the injection port is located, such that the lamp holder is adhered and fixed to the lamp shell after the light-transmitting adhesive is solidified by cooling.

6. The method of claim 1, wherein air is added during injection.

* * * * *